United States Patent Office 3,438,470
Patented Apr. 15, 1969

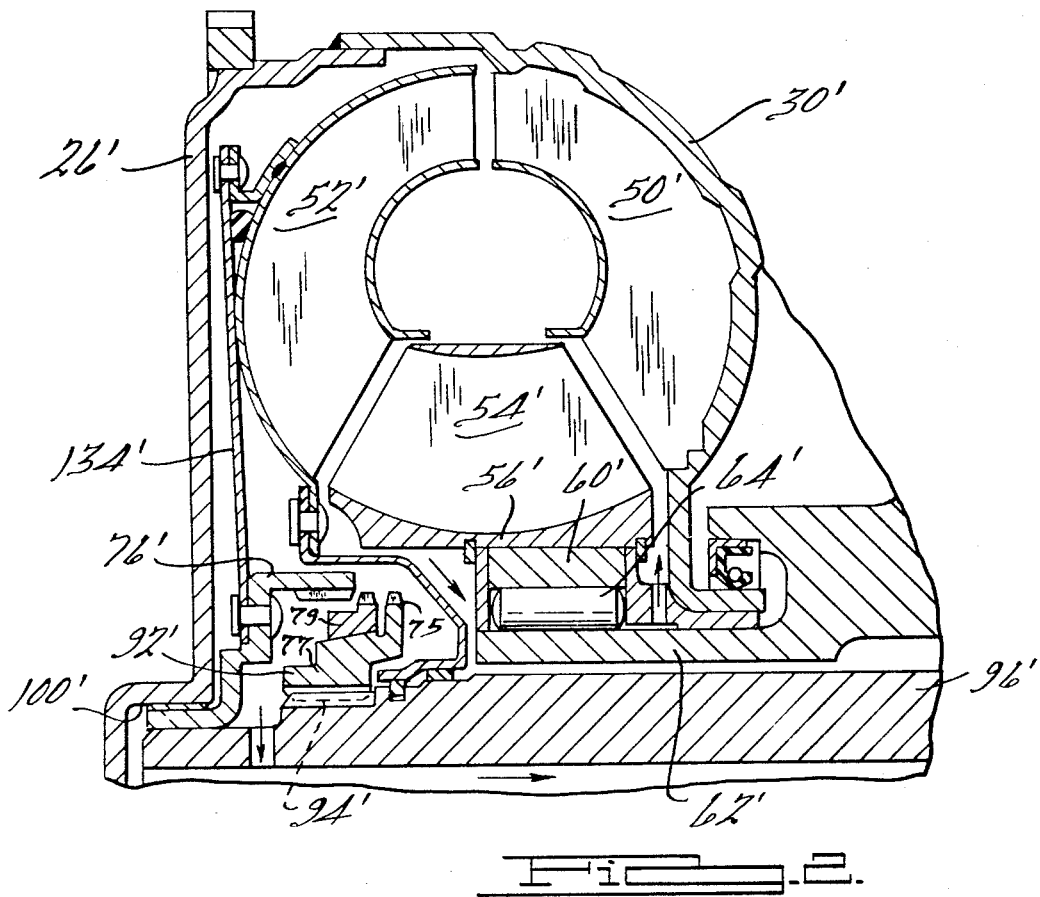

3,438,470
FLUID COUPLING IN SERIES WITH SYNCHRO-
NIZED POSITIVE CLUTCH
Robert E. Kaptur, Birmingham, Mich., assignor to Ford
Motor Company, Dearborn, Mich., a corporation of
Delaware
Filed Dec. 4, 1967, Ser. No. 687,518
Int. Cl. F16d 33/00, 35/00, 37/00
U.S. Cl. 192—3.33                          8 Claims

ABSTRACT OF THE DISCLOSURE

This specification describes a hydrokinetic power transmission mechanism including a torque converter powered by an internal combustion engine and multiple ratio gearing which defines plural torque delivery paths between a driven shaft and the converter turbine. At the moment of a ratio shift in the gearing, a synchronizer clutch located within the converter impeller shell disconnects the turbine from the power input element of the gearing thereby interrupting the torque delivery path between the engine and the driven shaft. After the gearing is conditioned for the changed speed ratio, the synchronizer clutch is re-engaged. But before engagement is complete, the power input element of the gearing rotates in synchronism with respect to the converter turbine.

Brief summary of the invention

This invention relates generally to automotive vehicle drivelines capable of delivering driving torque from an internal combustion vehicle engine to the traction wheels. The driveline is defined in part by a hydrokinetic converter driven by the engine. The converter includes an impeller shell which encloses each of the bladed members of the converter including the turbine. The shell defines a closed, hydrostatic fluid cavity. The power input shaft for the gearing extends coaxially with respect to the hydrokinetic unit.

A synchronizer clutch mechanism located within the torus cavity connects and disconnects the input shaft and the turbine. It includes a synchronizer sleeve with internal clutch teeth which engages external clutch teeth carried by the turbine. The sleeve in turn is mounted slidably on a synchronizer clutch hub that is connected directly to the power input shaft of the transmission gearing.

The sleeve is actuated by means of a diaphragm situated entirely within the torus cavity. The diaphragm cooperates with the outer shroud of the turbine to define a hydrostatic pressure chamber that is independent of the pressure in the torus cavity of the converter. When a differential pressure exists across the diaphragm, the sleeve is adapted to move into or out of engagement with the turbine clutch teeth.

Static pressure in the torus cavity of the converter acts on one side of the diaphragm. This pressure is used to establish a clutch sleeve actuating force. Motion of the sleeve is obtained by changing the pressure differential across the diaphragm.

Brief description of the views of the drawings

FIGURE 2 shows a modified form of my invention in longitudinal cross section.

Particular description of the invention

Figure 1:
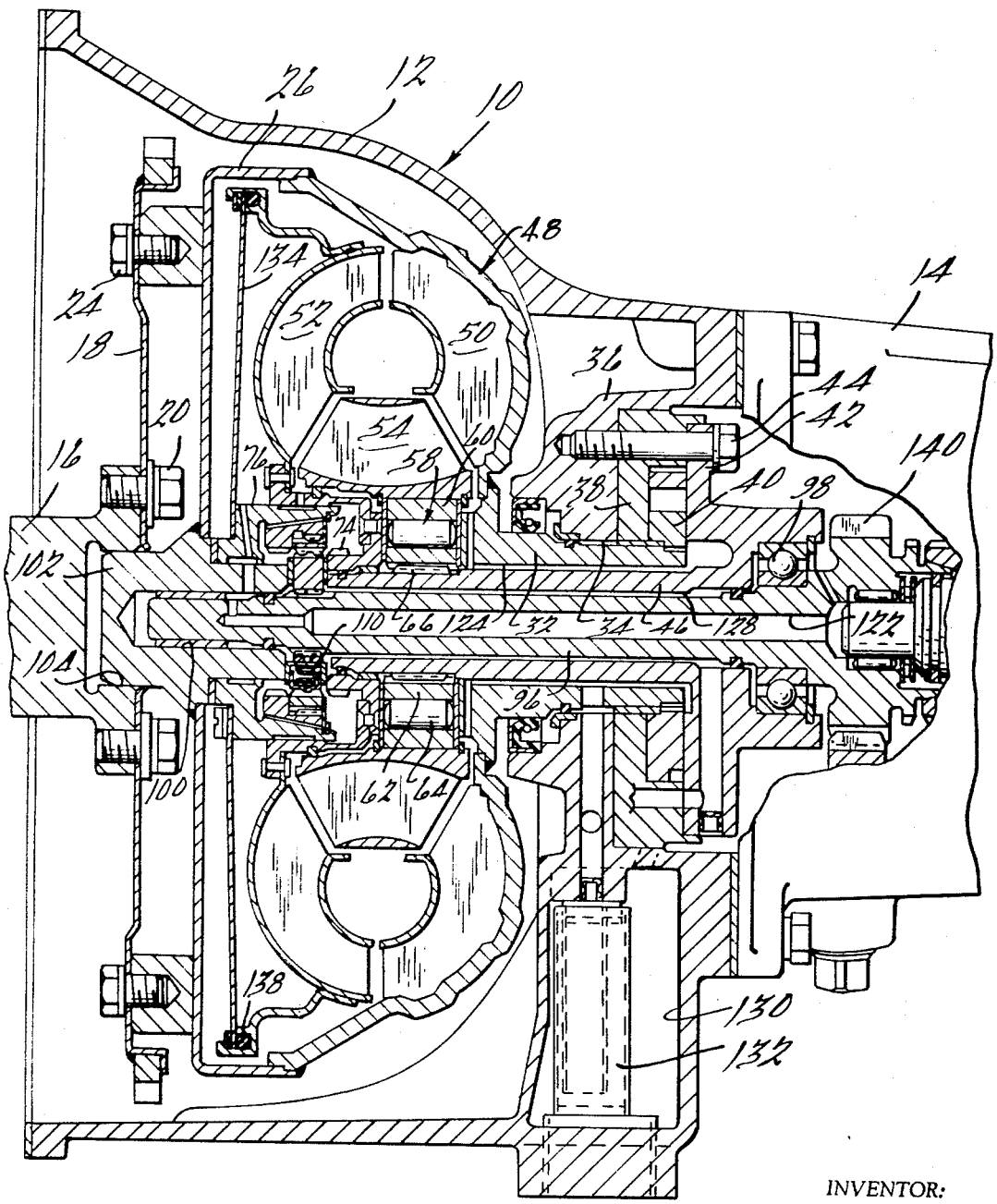
FIGURE 1 is a longitudinal cross-sectional view of the preferred embodiment of my invention.

In the drawings, numeral 10 designates a transmission housing which includes a converter bell housing portion 12 and a portion 14, the latter enclosing the torque transmitting gears. The left-hand margin of the housing portion 12 can be bolted or otherwise secured to the engine block of an internal combustion engine. The crankshaft for the internal combustion engine is shown at 16. A drive plate 18 is bolted by bolts 20 to a flange 22 of the crankshaft 16. The outer margin of the drive plate 18 is bolted by bolts 24 to the radially outward extremity of an impeller shell part 26, which is welded at 28 to the radially outward margin of a second shell part 30. The shell parts 26 and 30 define a closed toroidal flow cavity.

The hub of the shell part 30 is welded to a sleeve 32 which extends through a bearing opening 34 in a transverse housing wall 36. The wall 36 is formed with a positive displacement pump cavity within which is situated a pump housing 38 enclosing positive displacement pump gears 40. An end plate 42 is bolted by bolts 44 to the face of the pump housing 38 and to the wall 36. The pump, shown in part at 40, serves as a positive displacement pressure source for a valve system that supplies the toroidal fluid flow chamber of the converter with operating fluid under controlled pressure.

A relatively stationary sleeve shaft 46 is connected to the end plate 42 and extends axially with respect to the converter, the latter being identified generally by reference character 48.

The converter 48 includes a bladed impeller 50. A bladed turbine 52 and a bladed stator 54. The impeller, the stator and the turbine are situated in toroidal fluid flow relationship. The stator 54 includes a hub 56 which is supported by stator shaft 46. The hub receives an overrunning coupling 58 comprising an outer race 60, an inner race 62 and overrunning coupling brake elements 64. The race 62 is splined at 66 to the shaft 46 and is cammed to permit camming action with the rollers 64, thereby providing one-way braking action for the stator 54. Stator 54 is free to rotate in the direction of rotation of the impeller, but it is prevented from rotating in a direction opposite to the direction of rotation of the impeller.

Figure 1A:
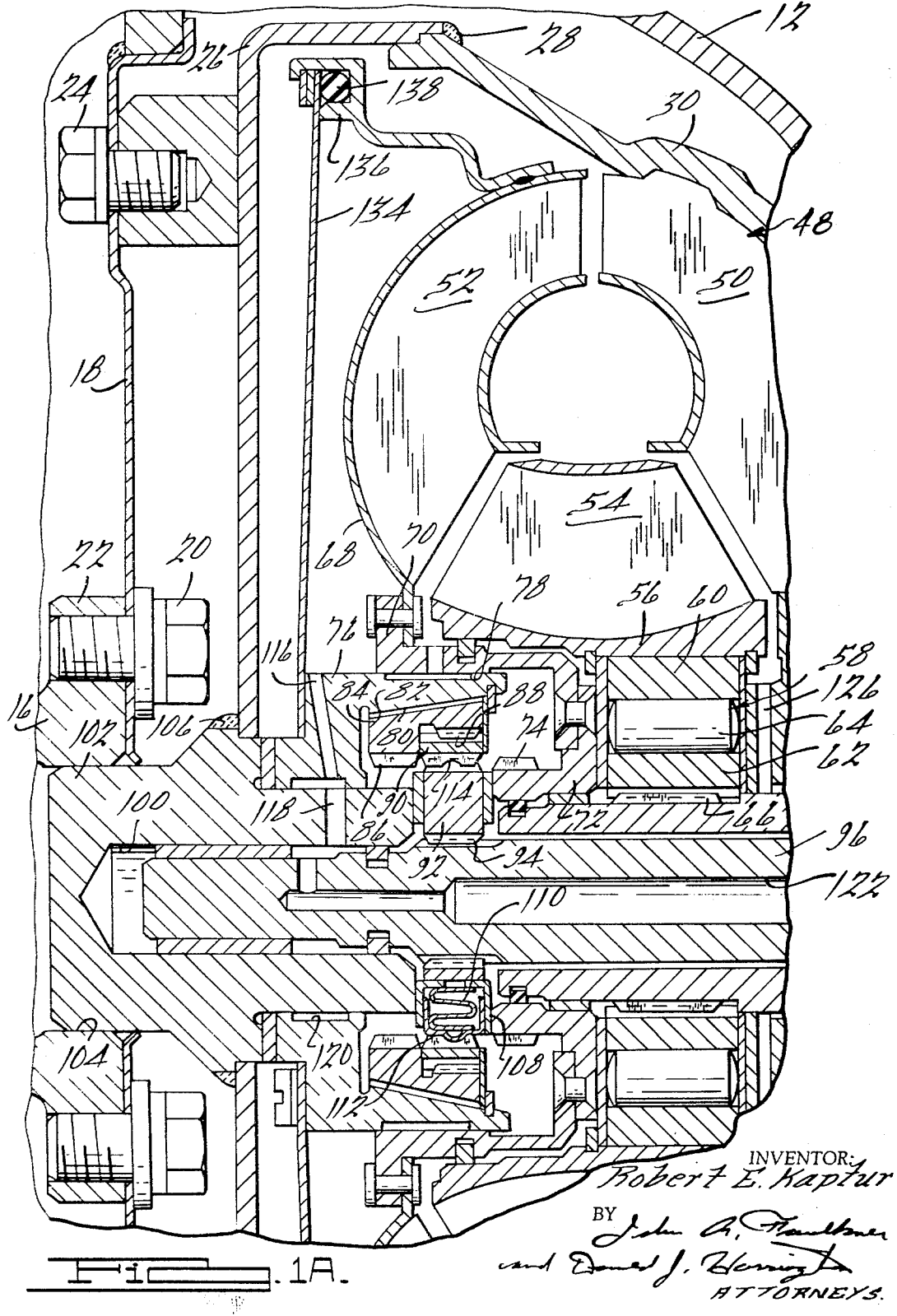
FIGURE 1A is an enlargment of a portion of the FIGURE 1 construction.

The turbine 52 includes an outer shroud 68 for the turbine blades. (See FIGURE 1A.) It is secured to the synchronizer clutch member 70, which in turn is secured directly to a synchronizer clutch ring 72 having external clutch teeth 74. A cone clutch ring 76 is situated slidably within an inner opening 78 of the member 70. Clutch ring 76 is formed with a cone clutch surface 80 which co-operates with an external cone clutch surface 82 formed on clutch ring 84. Ring 84 is formed with internal synchronizer clutch blocker teeth 86. It is formed also with clutch teeth 88, which drivably engage clutch ring 90. Internal clutch teeth are formed in the ring 90. A lost motion spline connection at 88 accommodates a limited degree of rotary relative displacement of the ring 84 with respect to the ring 90. The ring 90 is slidably splined on synchonizer clutch hub 92 which in turn is splined at 94 to turbine shaft 96. The shaft is positioned within sleeve 46.

Shaft 96 is rotatably supported at the right-hand end thereof by bearing 98. The left-hand end of the shaft 96 is journaled by means of a bushing within pilot opening 100 formed in hub 102 of shell part 26. The hub 102 in turn is positioned within a pilot opening 104 formed in the crankshaft 16. It is secured to the radially inward part of the shell part 26 by welding, as indicated at 106.

The clutch hub 92 is formed with radial slots within which are positioned detent spring retainers 108. Each retainer receives a detent spring 100 which acts on a detent element 112 and urges it radially outwardly. Each element 112 is formed with a projection that is received within a detent groove 114 formed in the inner spline teeth of the ring 90.

Clutch member 76 is formed with a radial passage 116 which communicates with radial passage 118 through an annular groove 120. Passage 118, which is formed in the hub 102, communicates with internal passage 122 formed in the turbine shaft 96. Shaft 96 is in fluid communication with a lubrication oil system.

Fluid is fed to the torus circuit of the converter through an annular passage 124 situated between the sleeve 32 and the stationary sleeve shaft 46. The fluid passes radially outwardly past thrust washer 126 and circulates through the torus circuit. The fluid is returned to the low pressure lubrication system through an annular passage 128 formed between the stationary sleeve shaft 46 and the turbine shaft 96.

The lower region of the housing portion 12 can serve as a sump as indicated at 130. This sump in turn is in fluid communication with the intake side of the pump shown in part at 40. If desired, a filter screen 132 can be inserted in the sump.

The circuit pressure in the torque converter acts on the left-hand side of a diaphragm 134 which is secured at its inner margin to the clutch member 76. Diaphragm 74 is secured at its outer margin to a drive member 136. An annular fluid seal 138 at the outer margin of the diaphragm 134 isolates the chamber on the right-hand side of the diaphragm 134 from the torus circuit. The drive member 136 is welded to the outer surface of the turbine shroud 68 so that the turbine is connected directly to the clutch member 76 through the diaphragm.

When the circuit pressure in the converter is sufficiently high relative to the lubrication oil pressure on the right-hand side of the diaphragm 134, diaphragm 134 will deflect thereby urging the clutch member 76 in a right-hand direction. The force required to overcome the detent force of the detent shown in part at 112 causes the cone clutch surfaces 82 and 80 to become frictionally engaged. Turbine rotation then is imparted to the synchronizer hub 92 and the turbine shaft 96. As synchronism is established, clutch ring 90 becomes shifted by the clutch member 84 until it engages drivably the external clutch teeth 74 of the clutch member 72. At that time a direct mechanical connection is established between the shaft 96 and the turbine 52. Before synchronism is established, blocker teeth 86 engage the ends of the external teeth on hub 92.

To disengage the turbine shaft 96 from the turbine, it merely is necessary to change the pressure differential across the diaphragm 134. The spring force inherent in the diaphragm then will return the member 76 to the position shown in the drawing. The turbine shaft 96 then is disconnected from the turbine. When this occurs normal ratio changes can be made in the gearing located within the housing portion 14.

The power input gear element for the gearing is shown at 140. After the gearing is conditioned for operation in any desired speed ratio, the clutch can be re-engaged by increasing again the pressure differential across the diaphragm 134.

The pressure differential across the diaphragm 134 can be changed either by reducing and increasing selectively the pressure in the torus circuit or by momentarily charging or exhausting the pressure in the chamber located between the diaphragm 134 and the shroud 68. If a positive, quick disengagement is desired, it is preferable to momentarily pressurize the chamber on the right-hand side of the diaphragm 134.

To assure positive engagement, provision may be made in the valve system, not shown, for momentarily increasing the circuit pressure to trigger shifting movement of the clutch member 76 into the engaging position.

The cone angle on the cone clutch can be chosen to meet any desired clutch characteristic. Also, the force of the detent spring can be chosen to establish the desired synchronizing force. The magnitude of the detent force can be made relatively high compared to conventional synchronizer clutch constructions since there is no external linkage in the system that would be subject to deflection resulting from a high detent force.

FIGURE 2 shows a modified form of my invention. The parts of the FIGURE 2 construction that have counterpart elements in the FIGURE 1 construction have been designated by similar reference characters, but prime notations are added.

In the FIGURE 2 construction, a synchronizer clutch element 76′ engages clutch teeth 75 on clutch element 77 to establish a driving connection between the turbine and shaft 96′ through the diaphragm 134′. An externally toothed blocker ring, which is engaged and actuated by element 76′, prevents clutching engagement of elements 76′ and 77 until synchronism between the turbine at shaft 96′ is established. The synchronizer cone clutch surfaces on the elements 79 and 77, respectively, correspond in function to surfaces 80 and 82 in the FIGURE 1 construction.

Having thus described a preferred form of my invention, what I claim and desire to secure by U.S. Letters Patent is:

1. A power transmission mechanism adapted to deliver driving torque from a driving member to a driven member comprising a hydrokinetic unit having an impeller and a turbine situated in toroidal fluid flow relationship in a torus circuit, said hydrokinetic unit comprising a closed housing, impeller blades carried by said housing, said turbine being situated within said housing, means for journaling said housing within a relatively stationary portion of said mechanism, said driven member being concentrically disposed with respect to said hydrokinetic unit, a positive engagement clutch means for connecting selectively said turbine to said driven member comprising a first clutch element connected to said driven member and a second clutch element connected to said turbine, a yieldable diaphragm in said converter housing having an outer periphery connected to said turbine and cooperating with said turbine to define on one side thereof a hydrostatic pressure chamber, the other side of said diaphragm being in fluid communication with said torus circuit, the inner periphery of said diaphragm being connected to one of said clutch elements for moving the same into engagement with the other clutch element when the pressure differential across said diaphragm is changed.

2. The combination set forth in claim 1 wherein said one clutch element is connected to the radially inward margin of said diaphragm, the radially outward margin of said diaphragm being connected to said turbine.

3. The combination set forth in claim 2 wherein said other clutch element comprises a movable ring having formed thereon first clutch teeth, the one clutch element having formed thereon other clutch teeth of said elements being brought into meshing engagement upon deflection of said diaphragm due to a pressure differential thereacross thereby establishing a driving connection between said turbine and said driven member.

4. The combination set forth in claim 3 wherein said converter housing comprises a first hub situated radially inwardly with respect to said diaphragm, said movable ring being slidably disposed on said hub and cooperating therewith to form an effective fluid seal isolating one side of said diaphragm from the other, and a pressure feed passage in said driven member and communicating with the space between said diaphragm and said turbine through said movable ring.

5. The combination set forth in claim 1 wherein said second clutch element is bipartite in form, one part thereof being formed with an internal cone surface and the other part thereof being formed with an external cone surface, said other part having external clutch teeth, a spline connection between said first clutch element and said driven member, said one part being connected to the inner periphery of said diaphragm whereby said cone surfaces frictionally engage each other upon deflection of said diaphragm thereby establishing synchronism between the motion of said turbine and the motion of said driven member.

6. The combination set forth in claim 2 wherein said second clutch element is bipartite in form, one part thereof being formed with an internal cone surface and the other part thereof being formed with an external cone surface, said other part having internal clutch teeth, said first clutch element having external clutch teeth, a spline connection between said first clutch element and said driven member, said one part being connected to the inner periphery of said diaphragm whereby said cone surfaces frictionally engage each other upon deflection of said diaphragm thereby establishing synchronism between the motion of said turbine and the motion of said driven member.

7. The combination set forth in claim 3 wherein said second clutch element is bipartite in form, one part thereof being formed with an internal cone surface and the other part thereof being formed with an external cone surface, said other part having internal clutch teeth, said first clutch member having external clutch teeth, a spline connection between said first clutch element and said driven member, one first part being connected to the inner periphery of said diaphragm whereby said cone surfaces frictionally engage each other upon deflection of said diaphragm thereby establishing synchronism between the motion of said turbine and the motion of said driven member.

8. The combination set forth in claim 4 wherein said second clutch element is bipartite in form, one part thereof being formed with an internal cone surface and the other part thereof being formed with an external cone surface, said other part having internal clutch teeth, said first clutch element and said driven member, said one part being connected to the inner periphery of said diaphragm whereby said cone surfaces frictionally engage each other upon deflection of said diaphragm thereby establishing synchronism between the motion of said turbine and the motion of said driven member.

References Cited
UNITED STATES PATENTS

| | | | |
|---|---|---|---|
| 2,727,606 | 12/1955 | Lapsley | 192—3.26 XR |
| 3,213,988 | 10/1965 | Maurice et al. | 192—3.33 XR |
| 3,239,037 | 3/1966 | Croswhite et al. | 192—3.33 XR |

BENJAMIN W. WYCHE III, *Primary Examiner.*

U.S. Cl. X.R.

192—88, 53